No. 747,437. Patented December 22, 1903.

UNITED STATES PATENT OFFICE.

WILLIAM L. KANN, OF PITTSBURG, PENNSYLVANIA.

MANUFACTURE OF GLASS PLATES OR SHEETS.

SPECIFICATION forming part of Letters Patent No. 747,437, dated December 22, 1903.

Application filed December 20, 1902. Serial No. 136,035. (No model.)

*To all whom it may concern:*

Be it known that I, WILLIAM L. KANN, of Pittsburg, Allegheny county, Pennsylvania, have invented a new and useful Improvement in the Manufacture of Glass Plates or Sheets, of which the following is a full, clear, and exact description.

The purpose of my invention is to manufacture glass plates or sheets which shall have the appearance of marble or onyx and which shall be formed of materials that are melted in and poured from a single pot. This, I believe, is new. It produces very beautiful results which cannot otherwise be obtained.

In the practice of my invention I place in a glass-melting pot a batch preferably of so-called "opal" or "white" glass of any of the usual compositions employed in the manufacture of such glass, though glass batches of other colors may be used, and when the melting of the batch has progressed for a sufficient time, preferably about one-half the time required to bring it to a finished condition ready for pouring, I introduce into the pot the coloring compound with which it is desired to color or striate the opal glass; but instead of introducing this coloring compound in the form of batch or powder, as is usual in compounding colored-glass batches, I introduce it in lumps or sticks of suitable sizes, which instead of diffusing at once through the opal glass sink to the bottom of the pot and melt under the body of opal glass. The melting of the entire batch is then proceeded with in the usual way until the materials have completely melted and settled and are ready to be poured. The pot is then removed from the furnace and its contents poured upon the casting-table. The first part of the material which comes from the pot is the white or opal glass, which constitutes the bulk of the contents of the pot. Then near the end of the pour the colored material from the bottom of the pot is discharged, and finally the remnant of opal material, which floats on top of the colored body during pouring. The effects produced can be controlled by manipulating a melt in such a manner that the bulk of the contents of the pot will absorb the coloring materials introduced sufficiently to remove the opal color, either wholly or partially. The contents are then rolled into a flat sheet or plate, with the effect of producing a solid plate of any desired thickness. Heretofore when more than one color was to be produced the glass would have to be opalescent or semitransparent and limited in thickness in order to obtain the full effect of the colors, whereas in this method the thickness does not interfere with the coloring effects, the colored material being irregularly stratified in the body of the mass. When such plate has been ground and polished, the colored striations appear in great beauty, resembling the variegated pattern of marble or onyx, and as the entire sheet has been poured from a single pot it is perfectly compact and seamless. Practice in pouring will enable the operator to vary the effects or markings of the plate and to control their arrangement as he may desire.

I claim—

1. The method hereinbefore described of making a plate of glass having variegated effects and colors, which consists in melting a batch, and before the melting is finished introducing thereinto coloring-matter which sinks therein, continuing the melting of the batch and, when it is finished, pouring the same; substantially as described.

2. The method hereinbefore described of making a plate of polished glass having variegated effects and colors, which consists in melting a batch, and before the melting is finished introducing thereinto coloring-matter which sinks therein, continuing the melting of the batch and, when it is finished, pouring the same, rolling and subsequently grinding and polishing the surface of the plate; substantially as described.

In testimony whereof I have hereunto set my hand.

W. L. KANN.

Witnesses:
THOMAS W. BAKEWELL,
H. M. CORWIN.